United States Patent
Nusser et al.

(10) Patent No.: US 9,561,590 B1
(45) Date of Patent: Feb. 7, 2017

(54) DISTRIBUTED SYSTEM FOR MANAGEMENT AND ANALYTICS OF ROBOTICS DEVICES

(71) Applicant: REDWOOD ROBOTICS, INC., San Francisco, CA (US)

(72) Inventors: Stefan Nusser, Palo Alto, CA (US); Aaron Edsinger, San Francisco, CA (US); Advait Jain, San Francisco, CA (US); Anthony Jules, Oakland, CA (US)

(73) Assignee: Redwood Robotics, Inc., San Francisco, CA (US)

( * ) Notice: Subject to any disclaimer, the term of this patent is extended or adjusted under 35 U.S.C. 154(b) by 149 days.

(21) Appl. No.: 14/311,810

(22) Filed: Jun. 23, 2014

Related U.S. Application Data

(60) Provisional application No. 61/838,712, filed on Jun. 24, 2013.

(51) Int. Cl.
*G05B 19/04* (2006.01)
*B25J 9/16* (2006.01)
*G05B 19/042* (2006.01)

(52) U.S. Cl.
CPC .......... *B25J 9/1661* (2013.01); *G05B 19/0421* (2013.01); *G05B 2219/40113* (2013.01)

(58) Field of Classification Search
CPC ........ B25J 9/0009; B25J 9/0084; B25J 9/0096
USPC ................................................. 700/245–264
See application file for complete search history.

(56) References Cited

U.S. PATENT DOCUMENTS

| | | | | |
|---|---|---|---|---|
| 2001/0017023 A1* | 8/2001 | Armington | .......... | B31D 5/0047 53/472 |
| 2003/0208903 A1* | 11/2003 | Morbitzer | ............. | B23P 19/001 29/791 |
| 2006/0111813 A1* | 5/2006 | Nishiyama | ....... | G05B 19/41815 700/253 |
| 2008/0243306 A1* | 10/2008 | Koike | ...................... | B23K 9/12 700/250 |
| 2008/0249791 A1* | 10/2008 | Iyer | ........................ | G06Q 10/06 705/1.1 |
| 2009/0129003 A1* | 5/2009 | Bruck | .................... | G08C 17/02 361/679.4 |
| 2012/0253516 A1* | 10/2012 | Iida | ........................ | B25J 9/1669 700/258 |

* cited by examiner

Primary Examiner — Harry Oh
(74) Attorney, Agent, or Firm — McDonnell Boehnen Hulbert & Berghoff LLP

(57) ABSTRACT

A system is provided, including one or more servers in communication with a robotic system. The one or more servers may be configured to receive operational data from the robotic system, and determine one or more operational performance metrics based on the received operational data. The system may also include a first computing device in communication with the robotic system including a workstation authoring software application configured to program the given task to be completed by the robotic system, and determine one or more subtasks required for the robotic system to perform the given task. The system may also include a second computing device in communication with the robotic system including an operational dashboard software application configured to control various operations of the robotic system, and provide for display a visual representation of the operational data and the operational performance metrics on an interface of the second computing device.

16 Claims, 15 Drawing Sheets

DISTRIBUTED SYSTEM FOR MANAGEMENT AND ANALYTICS OF ROBOTICS DEVICES

CROSS-REFERENCE TO RELATED APPLICATION

The present application claims priority to U.S. Patent Application Ser. No. 61/838,712, filed on Jun. 24, 2013, the entire contents of which are herein incorporated by reference.

BACKGROUND

Unless otherwise indicated herein, the materials described in this section are not prior art to the claims in this application and are not admitted to be prior art by inclusion in this section.

A workcell provides a mounting structure to attach robot peripherals, such as sensors, actuators, arms, computers, and power supplies. Usually, a technician integrates these peripherals to create a custom workcell solution to solve a specific task. This integration effort includes mechanically installing robot peripherals into the workcell, wiring these devices together, describing their configuration within an automation controller, and then calibrating a geometric location of these devices relative to each other and to the world.

This integration process can be time consuming and expensive. If it is desired to modify the workcell functionality, much of this integration effort is repeated. In addition, workcells often may not be able to be reconfigured since the workcells are usually customized for a specific task or requirement. A high cost of modification may also make it undesirable to swap out older or damaged devices. Further, workcells are mostly disconnected tools with limited support for remote operation and data exchange. As such, system management tasks are typically performed directly at the unit, which is a tedious and time consuming process. Furthermore, the data collected during operation of the workcells is a significant source of value that is currently untapped.

SUMMARY

In one example, a system is provided. The system may include one or more servers in communication with a robotic system including one or more modular reconfigurable workcells. The one or more servers may be configured to receive operational data from the robotic system including information indicative of one or more subtasks performed by the robotic system to complete a given task. The one or more servers may be further configured to determine one or more operational performance metrics based on the received operational data. The system may also include a first computing device in communication with the robotic system including a workstation authoring software application. The workstation authoring software application may be configured to program the given task to be completed by the robotic system. The workstation authoring software application may be further configured to determine one or more subtasks required for the robotic system to perform the given task, wherein the one or more subtasks include one or more parameters used to define the one or more subtasks, and wherein the one or more parameters include information required for the robotic system to execute a given subtask. The system may also include a second computing device in communication with the robotic system including an operational dashboard software application. The operational dashboard software application may be configured to control one or more operations of the one or more modular reconfigurable workcells of the robotic system. The operational dashboard software application may be further configured to provide for display a visual representation of the operational data and the one or more operational performance metrics on an interface of the second computing device.

In another example, another system is provided. The system may include one or more modular reconfigurable workcells including one or more modular docking bays on a surface of the workcell that support attachment of one or more docking modules in a fixed geometric configuration. The respective modular docking bays may include a plurality of electrical connections for a variety of power and communication busses of the one or more docking modules to be attached, and the one or more docking modules may provide an electrical and mechanical interface between a respective peripheral and the workcell. The system may also include one or more servers in communication the one or more modular reconfigurable workcells. The one or more servers may be configured to receive operational data from the robotic system including information indicative of one or more subtasks performed by the robotic system to complete a given task. The one or more servers may be further configured to determine one or more operational performance metrics based on the received operational data. The system may also include a computing device in communication with the one or more modular reconfigurable workcells. The computing device may include a workstation authoring software application configured to program the given task to be completed by the one or more modular reconfigurable workcells. The computing device may also include an operational dashboard software application configured to control one or more operations of the one or more modular reconfigurable workcells. The operational dashboard software application may be further configured to provide for display a visual representation of the operational data and the one or more operational performance metrics on an interface of the computing device.

In another example, a modular reconfigurable workcell is provided that may include one or more modular docking bays on a surface of the workcell that support attachment of one or more docking modules in a fixed geometric configuration, and respective modular docking bays including a plurality of electrical connections for a variety of power and communication busses of the docking modules to be attached. The workcell may also include one or more docking modules inserted within the one or more modular docking bays, and the one or more docking modules provide an electrical and mechanical interface between a respective peripheral and the workcell. The workcell may also include an electrical subsystem for coupling the communication busses between the one or more modular docking bays and providing power circuitry to the one or more modular docking bays. The workcell may also include one or more structural features in the one or more modular docking bays to enable insertion of the one or more docking modules in the fixed geometric configuration such that an orientation of the one or more docking modules relative to the workcell is uniquely defined. The workcell may also include one or more sensors configured to record operational data from the modular reconfigurable workcell, where the operational data includes information indicative of one or more subtasks performed by the robotic system to complete a given task. The workcell may also include one or more processors for determining a first calibration of attached peripherals based on the orientation of corresponding one or more docking modules attached to the one or more modular docking bays and based on an identification of the attached peripherals of the corresponding one or more docking modules. The one or more processors may further determine a second calibration of the attached peripherals based on the determined operational data.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

Within examples, a collaborative robotic system is provided. The system may include one or more servers and one or more computing devices designed to manage a network of robots and provide shared resources as well as data management and control services. In some examples, the robotic system may include one or more reconfigurable workcells that each include an enclosure that houses one or more modular docking stations. The enclosure may be sealed to an exterior environment, and able to rigidly support working forces exerted by an attached robot arm or other peripheral. The enclosure may be configured to be mounted to any surface including a worktable, floor, wall, or ceiling, for example. The enclosure includes computer and power requirements, and related devices needed for workcell functionality, and may utilize the surface of the enclosure as a work surface for a specific task.

In some examples, one or more modular docking stations are exposed on a top surface of the enclosure that support plug-and-play attachment of robot peripherals and may enable a tool-less quick connect such that the peripheral can be attached with no tools. The modular docking stations include features to prevent installation of the peripheral at an incorrect orientation, and features to ensure repeatable and precise alignment of the peripheral to the enclosure. The modular docking stations also may include features that allow for electrical connection of one or more power and communication busses to the attached peripheral without use of tools or manual electrical connectors.

The modular workcells may also be in communication with one or more servers and one or more computing devices. An example computing device may provide a wired or wireless client interface that enables a user to provide input to the workcells and visualize the workcells from a tablet, mobile phone, or other computing device. Further, the computing device may include a task verification and deployment system that informs a user if a desired task can be performed, and generates a procedure to interactively guide the user to correctly configure the workcell. In addition, the one or more servers may receive operational data from the workcells, and transmit such operational data to the computing device to provide a visual representation of the operational data on an interface of the computing device.

Figure 1:
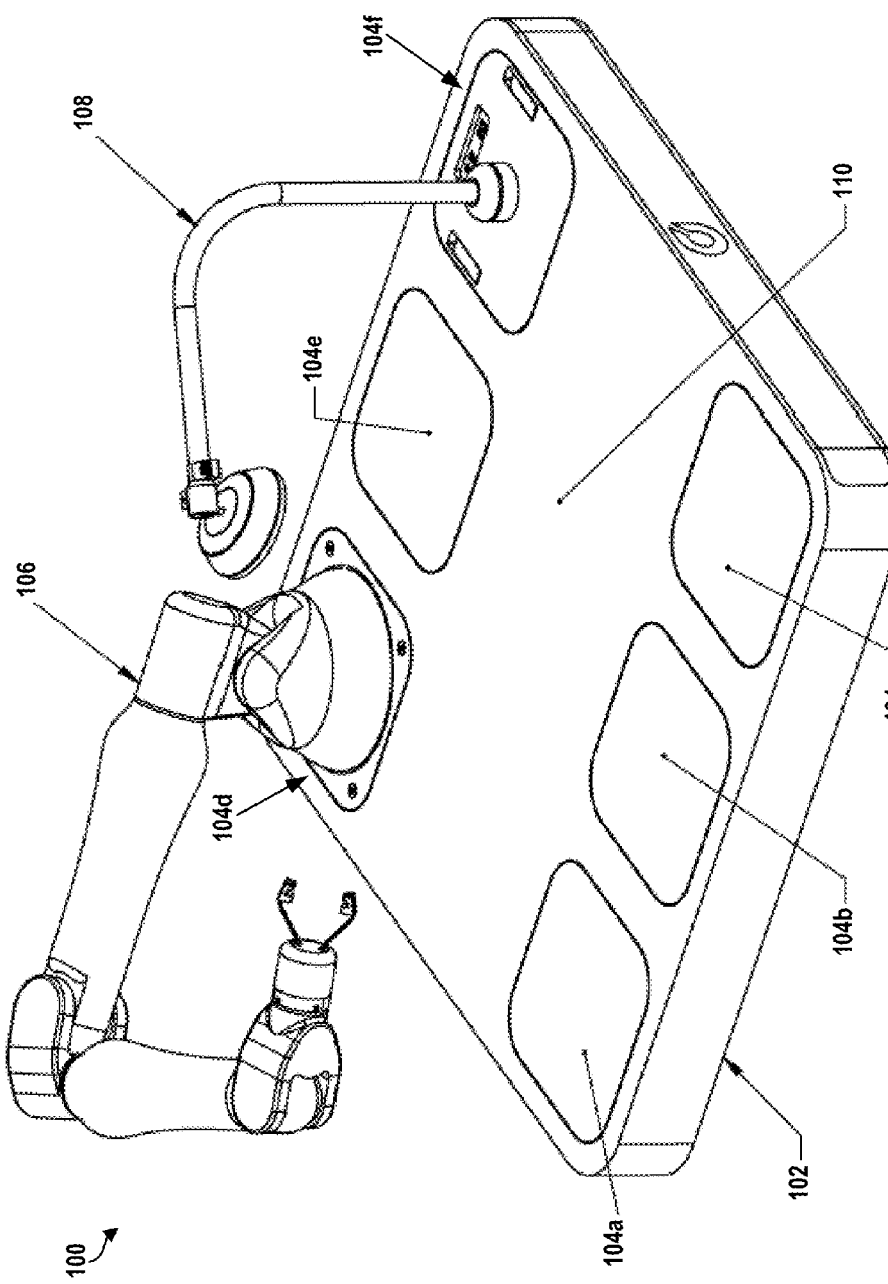
FIG. 1 illustrates an example modular reconfigurable workcell.

Referring now to the figures, FIG. 1 illustrates an example modular reconfigurable workcell 100 that may be used to perform tasks. The workcell 100 includes an enclosure 102 with six modular docking bays 104a-f arranged in a 2×3 array. The modular docking bays 104a-f are on a surface of the enclosure 102 and support attachment of one or more docking modules in a fixed geometric configuration. The modular docking bays 104a-f include a plurality of electrical connections for a variety of power and communication busses of the docking modules to be attached, and the docking modules provide an electrical and mechanical interface between a respective peripheral and the workcell 100. As shown in FIG. 1, two modular docking bays 104d and 104f include docking modules inserted and configured with two peripheral modules that include a robot arm peripheral 106 and a camera peripheral 108, although any variety and configuration of peripherals may be achieved. Other example peripherals include a fixture for locating a device-under-assembly, and a measurement tool for measuring a device-under-inspection. In addition, other numbers and arrangements of docking stations may be chosen.

Each modular docking bay 104a-f is a location that a peripheral module can be inserted. A top of the enclosure 102 may include areas without docking stations, providing a work surface 110 for automation tasks. Because the work surface 110 is on the enclosure itself, a location of a work object and calibration may be achieved. Inclusion of areas without docking bays also creates volume inside of the enclosure 102 that is not occupied with docking bay hardware. This volume may be used for internal subsystems, such as a computing device, as an example.

As shown in FIG. 1, modular docking bays that do not have docking modules inserted, such as the modular docking bays 104a, 104b, 104c and 104e, may each include a cover installed to seal the docking bays if a peripheral is not present.

Figure 2A:
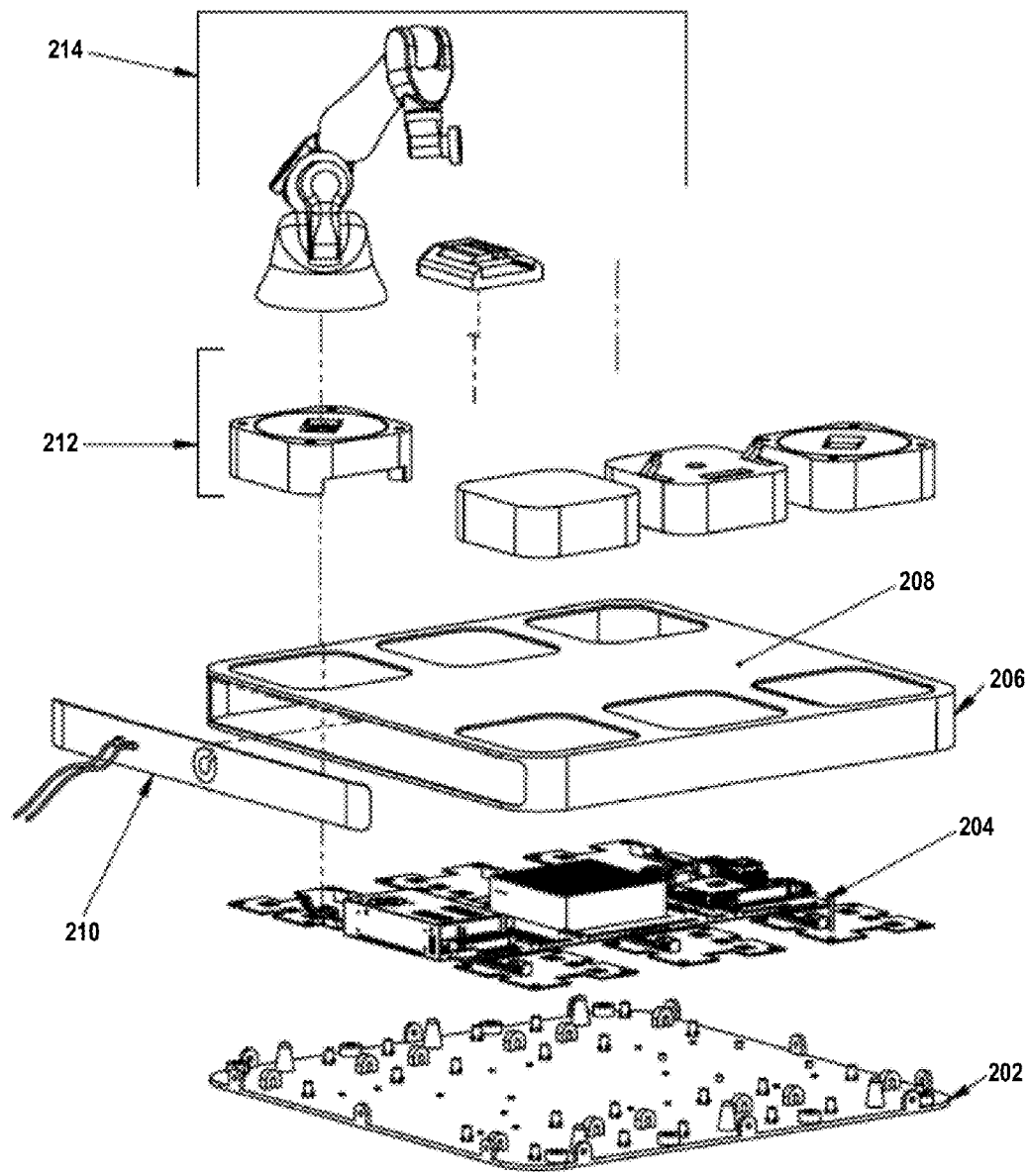
FIG. 2A illustrates an exploded view showing an example of an internal structure of an enclosure.

FIG. 2A illustrates an exploded view showing an example of an internal structure of an enclosure. The enclosure includes a bottom plate 202 that may include features for mechanically attaching peripherals. The bottom plate 202 may act as a structural element, allowing a mechanically attached peripheral to pass a load to a mounting surface of the enclosure. The bottom plate 202 may also provide features for mounting an electrical subsystem or backplane 204. The backplane 204 electrical subsystem may include computers, power supplies, and electronics that interface attached peripherals to the computers. The backplane 204 may couple communication busses between modular docking bays and provide power circuitry to the modular docking bays. The backplane 204 may be considered an electrical subsystem and may comprise or be a wire harness.

The enclosure also includes side plates 206 and a top plate 208 which form the enclosure when attached to the bottom plate 202. The enclosure may be sealed to prevent ingress of unwanted dust, liquid, or other environmental elements. The top plate 208 has identical holes cut into the top plate 208 to accommodate each docking bay.

A back panel 210 provides electrical connections for power and communication between the backplane electrical subsystem 204 and an external source. Docking modules, such as docking module 212, may be inserted into each docking bay. The docking module 212 provides an electrical and mechanical interface for integrating a wide variety of peripherals, such as the robot arm 214 to the enclosure.

Figure 2B:
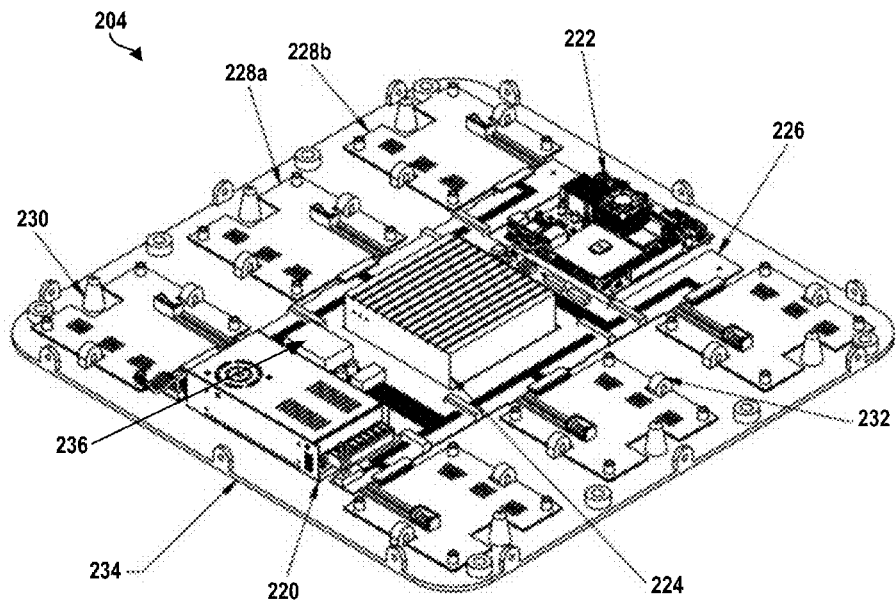
FIG. 2B illustrates an example backplane with attached subsystems.

FIG. 2B illustrates an example backplane electrical subsystem 204 with attached subsystems. The subsystems provide functionality required for the workcell. The subsystems may include a power supply 220, a control processor 222 for handling real-time control of robot arm peripherals, a task processor 224 for handling non real-time tasks, and a central backplane printed circuit board (PCB) 226 that provides electrical interconnects between one or more dock station PCBs 228a-b and the processors 222 and 224.

The backplane PCB 226 may include functionality for multiplexing communication busses, bus hubs or switches, power management circuitry, or computational resources. Each modular docking bay has an identical form factor. The dock station PCBs 228a-b may attach to the backplane PCB 226 by card edge connectors, by a wire harness, or by being part of the backplane itself. The backplane 204 may further include features for attachment and registration of docking modules. One or more tapered posts 230, latch hooks 232, or threaded extrusion features can act as a mechanical interface between a bottom plate 234 of the backplane 204 and a docking module, for example.

The backplane 204 may further include an inertial measurement unit (IMU) 236 to determine an acceleration experienced by the workcell, for example. The IMU 236 may monitor for abnormal accelerations imparted to the backplane 204. Abnormal accelerations can be an indication of a malfunctioning arm peripheral or unexpected contact with a person or other machinery. In some examples, upon detection of an abnormal acceleration, the workcell can operate in a safety fault mode. In addition, the IMU 236 can provide an orientation of the backplane 204 with respect to gravity. Some peripherals, such as a robot arm, can benefit from knowledge of a gravity vector to accomplish gravity compensation based control. The IMU 236 may output the control processor 236, which may receive the acceleration and determine an indication of a malfunctioning peripheral or contact of a peripheral with another element.

Figure 2C:
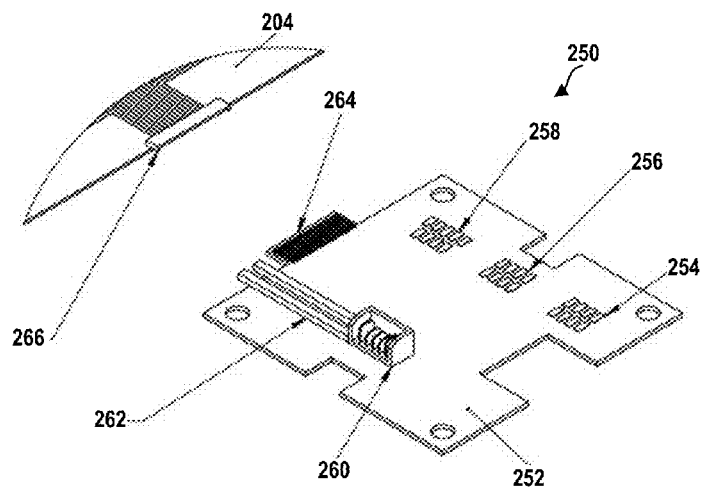
FIG. 2C illustrates an example docking station PCB that interfaces electrical signals from the backplane to a docking module.

FIG. 2C illustrates an example docking station PCB 250 that interfaces electrical signals from the backplane 204 to a docking module. The docking station PCB 250 includes a PCB 252 with one or more locations for quick electrical connect receptacles 254, 256, 258, and 260 placed such as to make an electrical connection to a corresponding connector on a docking module when a peripheral is inserted. The receptacles may be exposed foil pads, such as receptacles 254, 256, and 258, blade connectors, such as receptacles 260, or related spring electrical quick connect features. The docking station PCB 250 includes registration features to ensure precise and repeatable installation inside the enclosure. The docking station PCB 250 may include power bus bars 262 for a power bus. A PCB edge connector 264 may be employed to connect the docking station PCB 250 to a corresponding connector 266 on the central backplane PCB 204.

Figure 2D:
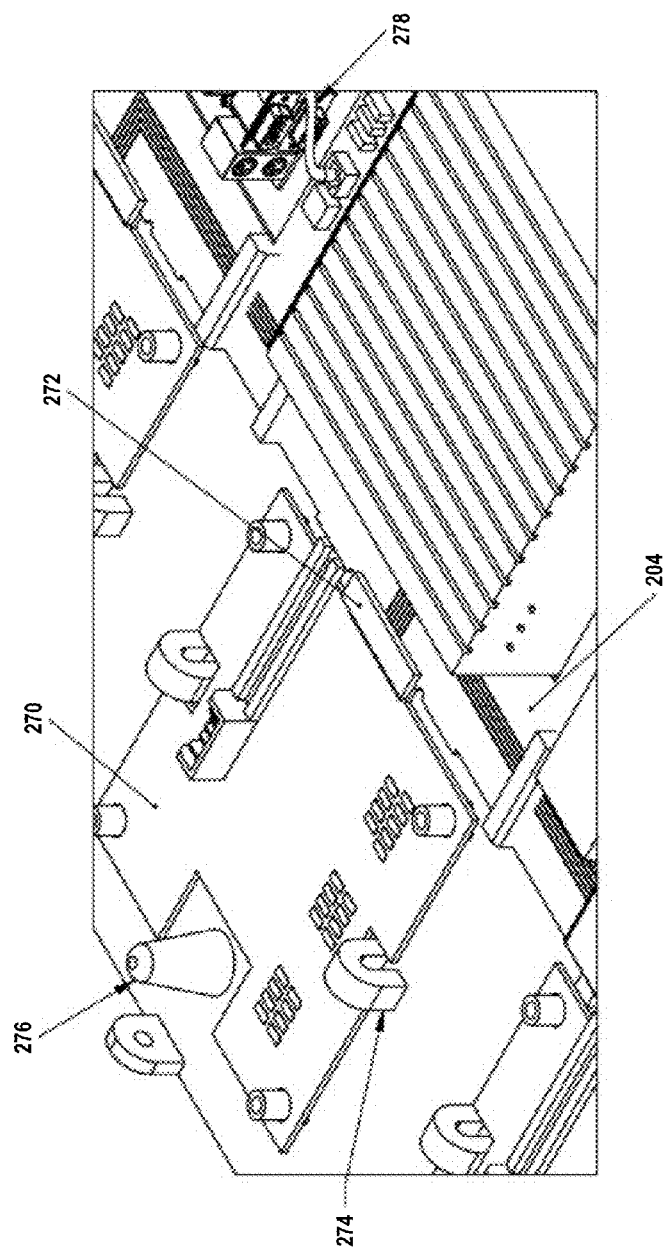
FIG. 2D illustrates a detailed view of a dock station PCB installed in the enclosure.

FIG. 2D illustrates a detailed view of a dock station PCB 270 installed in the enclosure. The dock station PCB 270 includes a card edge connector 272 attaching to the central backplane PCB 204. Also shown are mechanically connection hooks 274 and a tapered post 276 to ensure alignment during peripheral installation. The backplane PCB 204 may also provide power and communications to attached computers 278.

Thus, as shown in FIGS. 2A-2D, the workcell includes a processor in the enclosure, and one or more modular docking bays couple to one or more docking modules through the backplane and via a printed circuit board (PCB) card edge connector or a wire harness. The modular docking bays include a variety of electrical connections, such as Ethernet, Firewire, CANBUS, and USB connections, to couple to the docking modules. The enclosure further includes a power supply and a central backplane circuitry board that provides electrical interconnects between the one or more docking modules and the power supply and between the one or more docking modules and the processor. The enclosure all the one or more modular docking bays to be accessible through a surface of the workcell, and may be sealed to an outside environment.

Within examples, the workcell shown in FIGS. 2A-2D enables co-locating a peripheral with a power and control system in one enclosure to avoid a need for a connection wiring harness.

Figure 3:
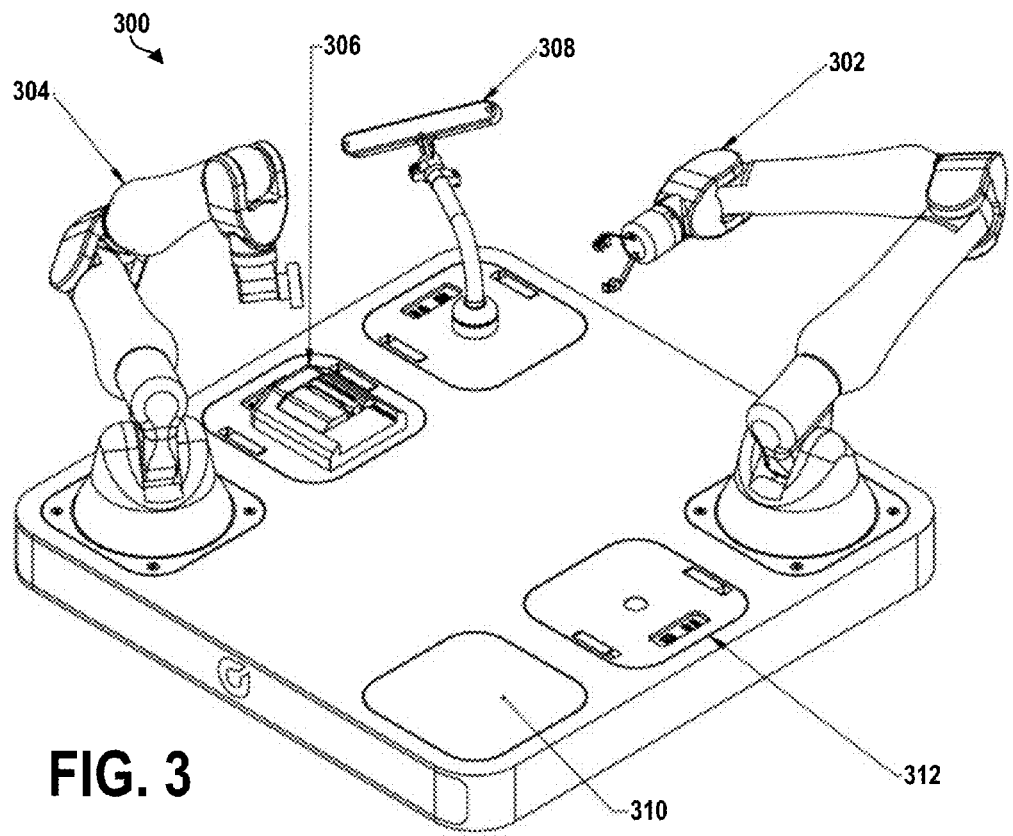
FIG. 3 illustrates an example modular reconfigurable workcell.

FIG. 3 illustrates an example modular reconfigurable workcell 300. The workcell 300 includes different peripherals installed in each docking bay including a seven degree of freedom (DOF) arm peripheral with gripper 302, a seven DOF arm peripheral with camera 304, a test device peripheral for assessing device-under-test functionality 306, a 3D sensor peripheral for measuring a location of a device-under-assembly 308, a docking bay cover 310, and an expansion input/output (I/O) peripheral 312 for interfacing to external devices such as test machines, PLCs, and safety guards. Any of the peripherals may be inserted within any docking bays and configured as desired for a specific application or task. Within examples, each modular docking bay is identical, and docking bays without inserted docking modules and peripherals may include the cover 310 cover secured over the modular docking bay to provide a uniform working surface and protect the electrical subsystem.

Figure 4:
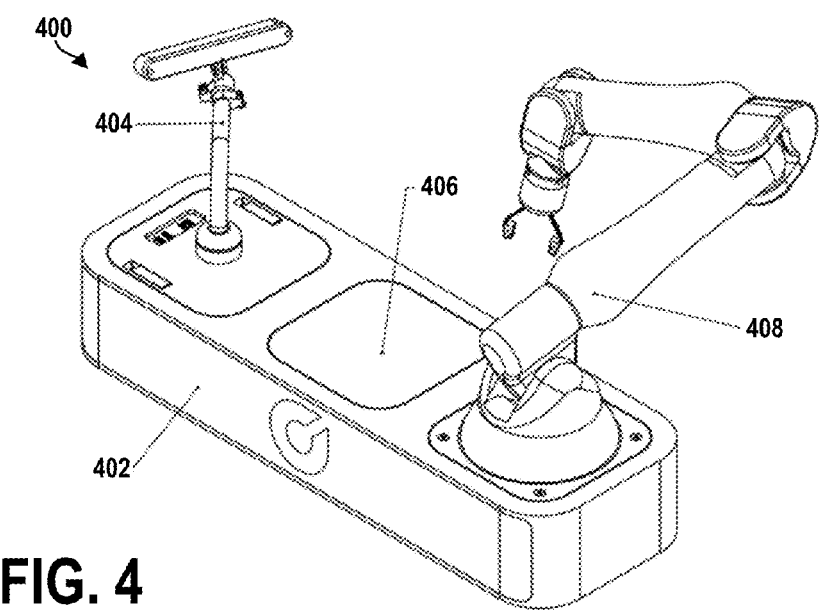
FIG. 4 illustrates another example modular reconfigurable workcell.

FIG. 4 illustrates an example modular reconfigurable workcell 400. The workcell is configured to include a 1×3 array of docking bays. In this configuration, the workcell 400 includes an enclosure 402 that has two internal layers such that internal computers, power supplies, and electronics may be positioned underneath each docking bay. In this example, an intermediate plate can be used for peripherals 404, 406, and 408 to dock to. An internal support structure can then transfer load to a base plate, for example.

Thus, within examples, workcells may be provided including modular docking bays arranged in an M×N array (e.g., 2×3 as shown in FIG. 1), and power circuitry and other computers can be arranged between rows of the modular docking bays. In other examples, workcells may be provided including modular docking bays arranged in a 1×M array (e.g., 1×3 as shown in FIG. 4), and power circuitry and computers can be arranged underneath a row of the modular docking bays.

In further examples, additional peripherals may include a sliding mechanism that couples between two docking modules, and another peripheral may attach to the slide to move from one docking bay to another. In this manner, the workcell may be positioned next to a conveyer belt, and a peripheral may move alongside the conveyer belt. Thus, multiple modules may be coupled together with a slide to combine two modules and extend a reach of one or more peripherals. The modules would be able to exchange geometry information with each other and the slide to perform calibration, for example.

Figure 5:
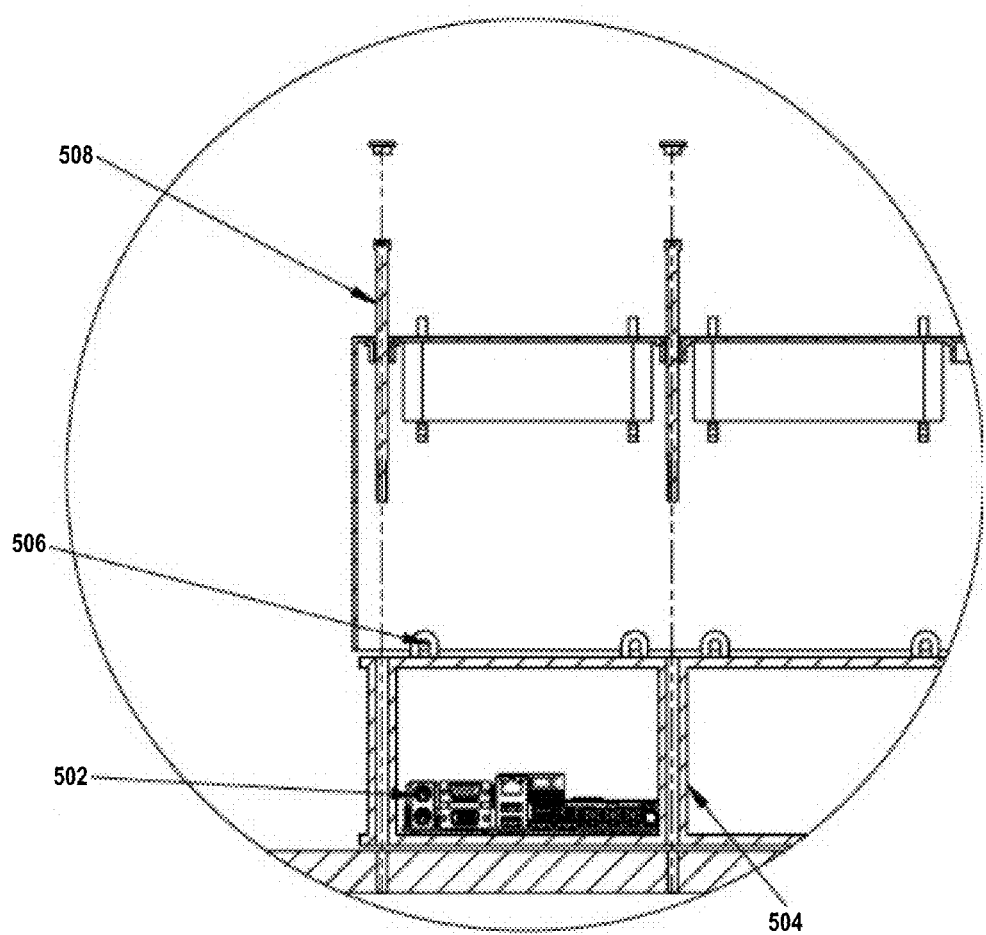
FIG. 5 illustrates an example two layer construction of an enclosure to support a 1×3 arrangement of docking bays and similar arrangements.

FIG. 5 illustrates an example two layer construction of an enclosure to support a 1×3 arrangement of docking bays and similar arrangements. In FIG. 5, internal electronics 502 within a lower layer are provided and constructed within a rigid metal frame 504. A docking module mounting plate 506 is attached to a top of the metal frame 504 such that docking modules can be attached to the docking module mounting plate 506 with bolts 508 or a similar mechanism.

Figure 6:
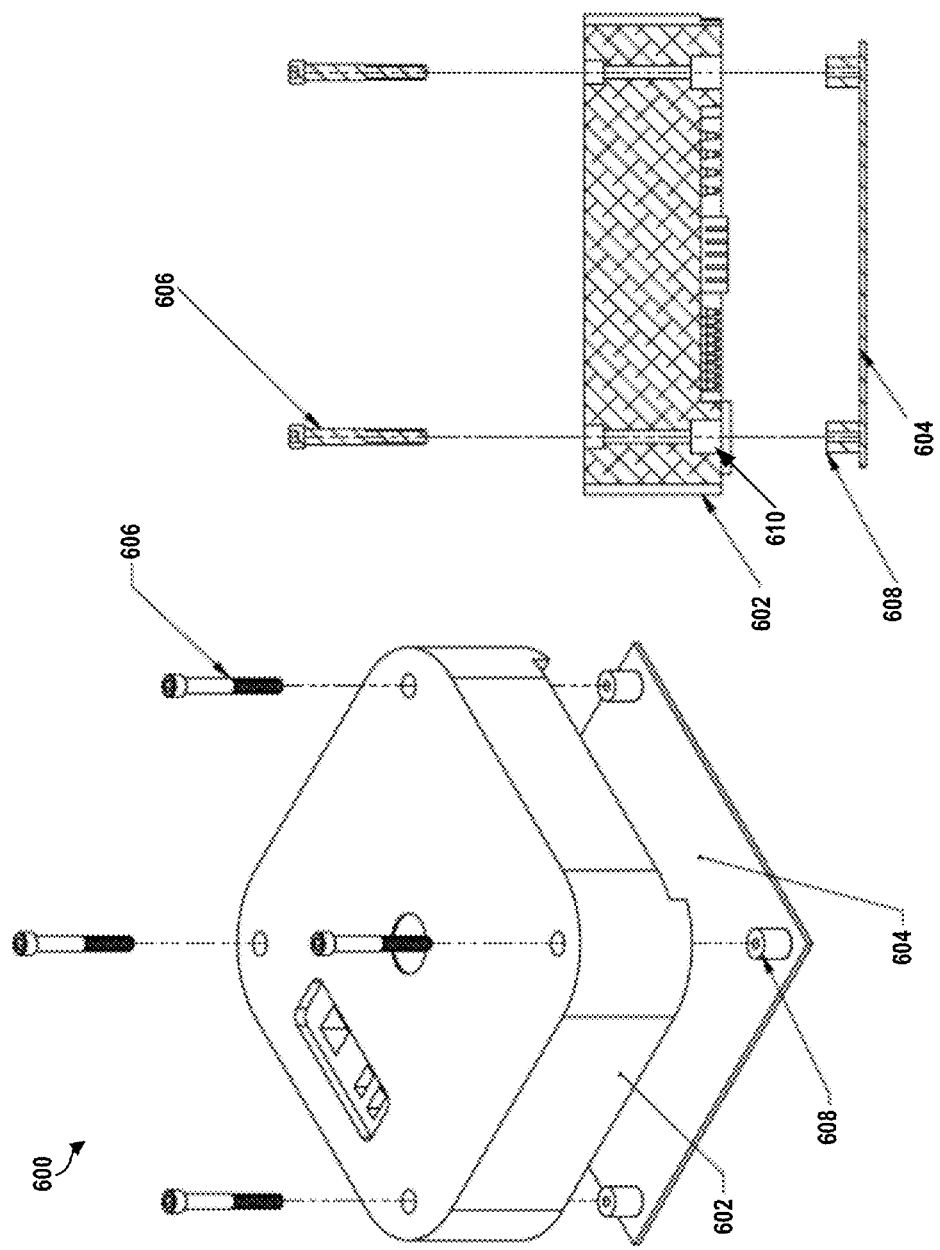
FIGS. 6A-6B illustrate a top and cross-sectional view of an example docking module 600.

FIGS. 6A-6B illustrate a top and cross-sectional view of an example docking module 600. The docking module 600 functions as an electrical and mechanical interface between a peripheral and the enclosure. The docking module 600 includes a housing 602 that transfers load from a peripheral to a bottom plate 604 of the enclosure. If the peripheral can produce high loads, such as with a robot arm, the housing 602 may be a rigid metal. If the peripheral produces lighter loads, such as with a camera, the housing 602 may be an injection molded plastic. Alternatively, the peripheral load may be transferred to the mounting surface through the enclosure shell. In this example, the enclosure side plates may be extruded, machined, cast, or sheet metal.

The docking module 600 may be inserted through a top of a base of a workcell along a single direction. The docking module 600 may be attached with one or more bolts 606 that screw into threaded features in the bottom plate 604. Each threaded feature may include an extended boss 608 that acts to precisely align the docking module 600 to the bottom plate 604 and to provide load transfer between the docking module 600 and the bottom plate 604. The boss 608 may include a taper to allow for initial alignment.

A threaded feature on the bottom plate 604 may form a precise slip fit with a receptacle 610 on the housing 602, as shown in FIG. 6B, to precisely align the docking module 600. Within examples, non-symmetric spacing of these features ensures that there is only one achievable insertion orientation.

Attachment and registration features of the housing 600, such as the receptacle 610, act to provide handedness such that a pose and orientation of the docking module 600 relative to the bottom plate 604 is precisely and uniquely defined. This allows a geometric calibration of an attached peripheral to be specified at design time up to a precision of a manufacturing process. Thus, the receptacle 610 may be a structural feature in the docking module 600 that aligns with the boss 608 structural feature of the modular docking bays to enable insertion of the docking module 600 in the fixed geometric configuration such that an orientation of the docking module 600 relative to the workcell is uniquely defined.

Figure 7:
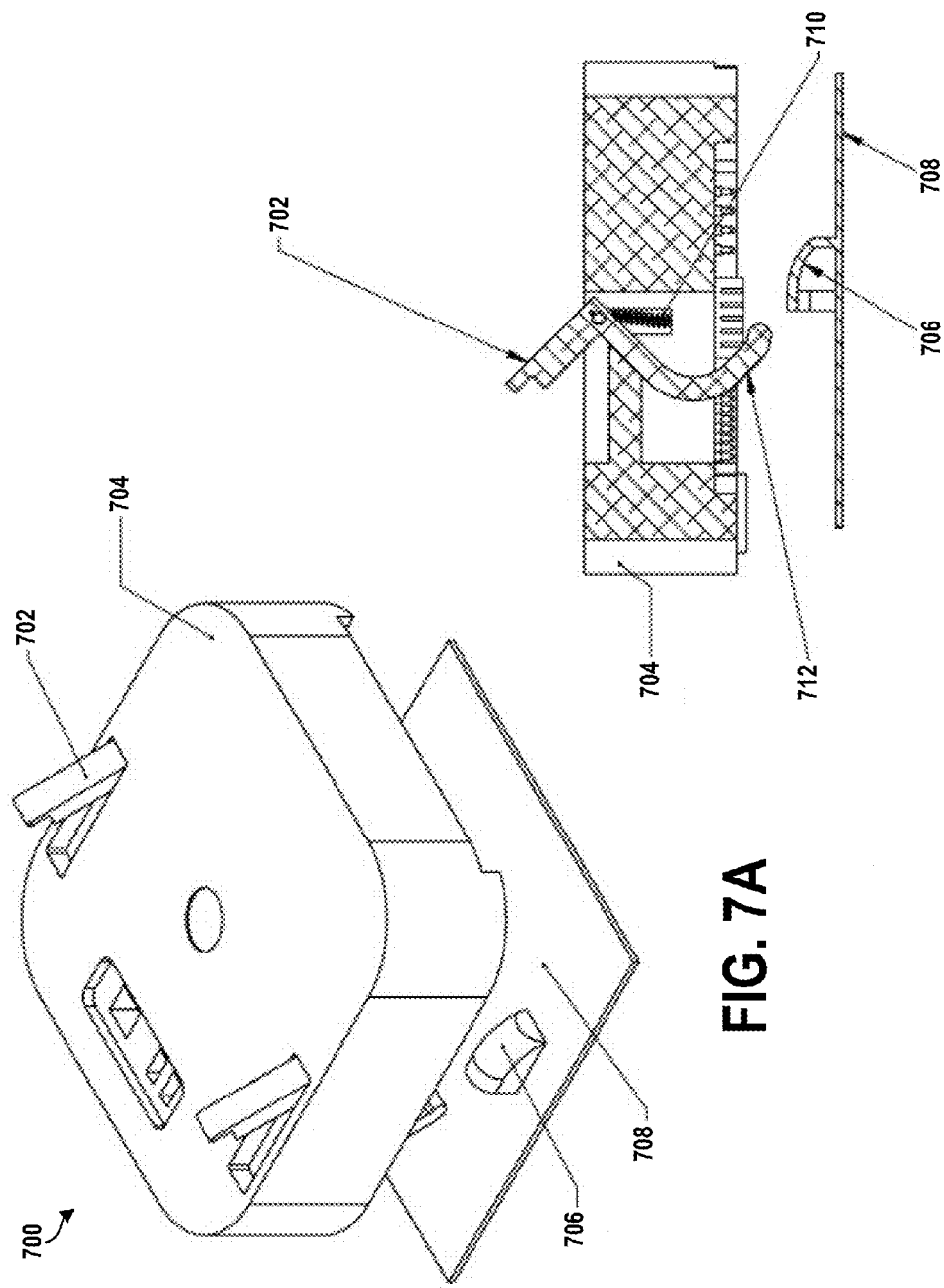
FIGS. 7A-7B illustrate insertion of an example docking module.

FIGS. 7A-7B illustrate insertion of an example docking module 700. The docking module 700 may be inserted using a tool-less method, for example. In this example, one or more lever arms 702 on a housing 704 of the docking module 700 engage with hooks 706 attached to a mounting plate 708. When the lever arm 702 is engaged with the hook 706, a constant clamping force is generated between the docking module 700 and the mounting plate 708. This force can be generated using a spring 710 or by using an over center cam contour 712 in the lever arm 702. The spring 710 allows the lever arm to flip into an up position when the docking module 700 is detached. Other mechanisms can be used to generate a same effect of creating a rigid connection by a constant pressure between the docking module 700 and the mounting plate 708.

Figure 8:
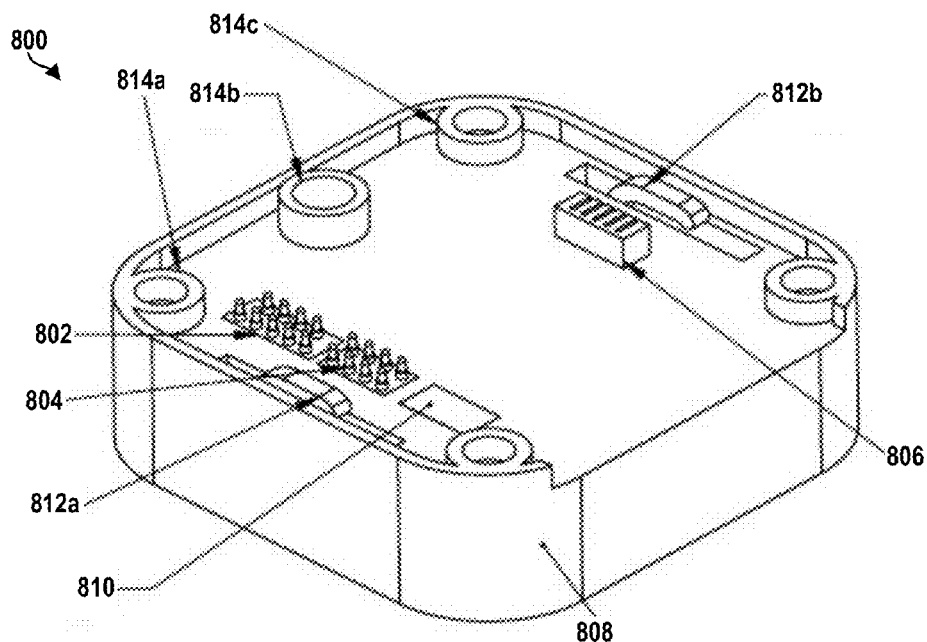
FIG. 8 illustrates a bottom view of an example docking module.

FIG. 8 illustrates a bottom view of an example docking module 800. The docking module 800 enables electrical quick connections between peripheral electronics and enclosure electronics. To achieve an electrical quick connection, spring loaded pin connectors 802 and 804 (e.g., pogo pins) may be used to contact against foil of a rigid PCB. Alternatively, a metal blade connector 806 can be used that inserts into a mating receptacle. Other similar quick connect technologies can be employed that enable appropriate tolerance to misalignment during module insertion.

The docking module 800 including a housing 808 which includes a PCB that provides the quick-connect connectors 802, 804, 806, and 810. Each connector is routed on the PCB or wiring harness to internal electronics of the peripheral. A location and function of each connector can be a fixed according to an electrical interface specification. This allows for modular connection of a range of peripheral devices that adhere to the electrical interface specification.

As shown in the FIG. 8, the connector 802 is a nine-pin bus, the connector 804 is an eight-pin bus, and the connector 806 is a five-blade power bus. If a peripheral does not support a particular connector functionality, a location of the connector may be left blank, as shown by the connector location 810. A docking module needs to only populate pins for the communication and power busses that are required for that specific module. A geometric arrangement is such that absence of a connector's spring pins results in no electrical connection being made to the peripheral for that particular bus.

The docking module 800 is also shown to include features to couple to a bottom plate, such as lever arms 812a-b, and alignment receptacles 814a-c. The alignment receptacles 814a-c may align with extended bosses within which screws can be inserted to fasten the docking module to the bottom plate, for example.

Figure 9:
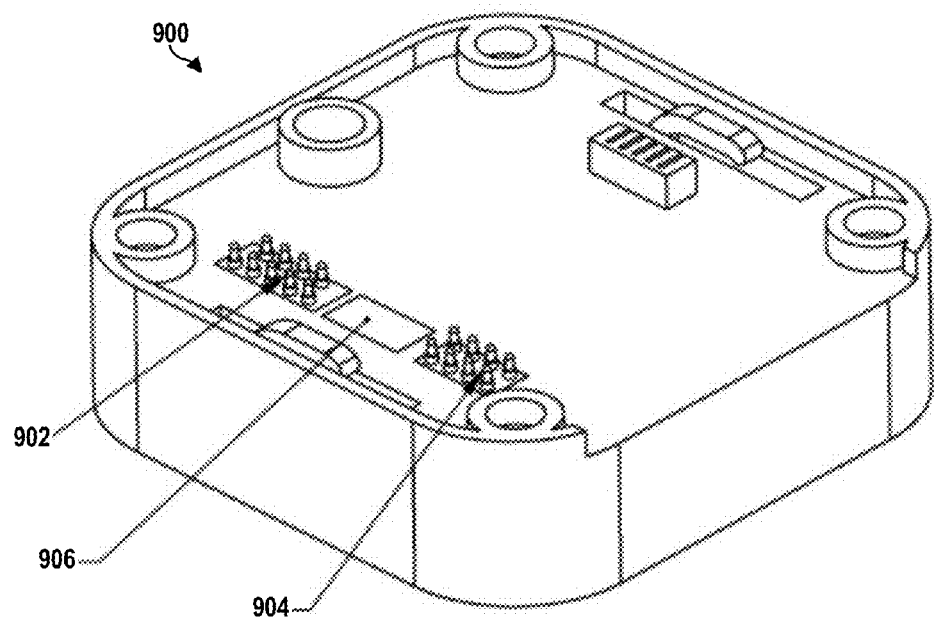
FIG. 9 illustrates a bottom view of another example docking module.

FIG. 9 illustrates a bottom view of another example docking module 900. In FIG. 9, an alternate spring connector configuration is provided for the docking module 900. In this configuration, a peripheral supports a nine-pin bus 902 and an eight-pin bus 904 as well as a power bus. Another bus location 906 is not supported, and is left blank. Thus, docking modules can provide different types of buses, and by populating different component locations of the docking modules, a customized connection can be implemented for a specific peripheral.

Figure 10:
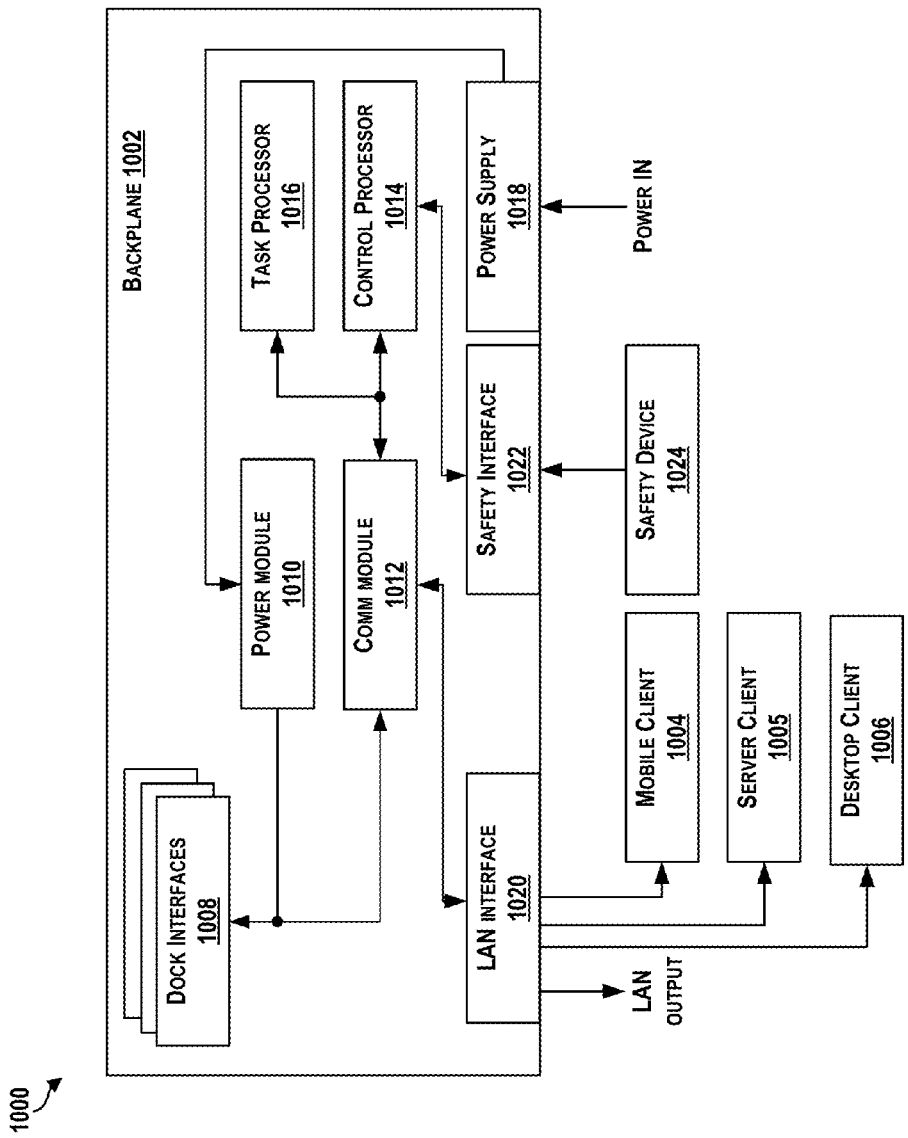
FIG. 10 is a block diagram illustrating example functional architecture of components of a workcell.

FIG. 10 is a block diagram illustrating example functional architecture of components of a workcell 1000. The workcell includes a backplane electrical subsystem 1002 that couples to clients, such as a mobile client 1004, a server client 1005, and a desktop client 1006, or other integrated displays and input devices that provide graphical user interfaces to allow a user to configure and program the workcell 1000. For instance, the mobile client 1004 may be a tablet device that communicates wirelessly with the workcell 1000.

The backplane 1002 includes modular bay dock interfaces 1008, a power module 1010, a communication module 1012, a control processor 1014, a task processor 1016, a power supply 1018, a local area network (LAN) interface 1020, and a safety interface 1022.

The backplane 1002 provides electrical interconnection of the dock interfaces 1008, the power module 1010, the communication module 1012, and CPUs 1014 and 1016. The backplane 1002 may comprise one or more interconnected PCBs. The modular bay dock interfaces 1008 enable a docking module to couple to the workcell 1000. For example, the dock interface 1008 provides digital communication, power, and mechanical attachment to attached peripherals, and may define electrical, mechanical, and software standards required of all compatible peripherals.

The power module 1010 distributes power from the power supply 1018 to each dock interface 1008 and processor 1014 and 1016. The power module 1010 may include power monitoring, soft start, safe shutdown, and uninterruptable power supply features. The power supply 1018 may convert battery or line (AC) power to generate one or more supply voltages required to power the connected peripherals and the on-board computers.

The communication module 1012 may route communication bus signals from each dock interface 1008 to network interfaces of the CPUs and LAN. The communication module 1012 may comprise one or more USB, EtherCAT, Ethernet hubs, switches, or crossover pass through, as well as other common bus types. The LAN interface 1020 provides a wired or wireless networked connection from the backplane 1002 to other devices.

The control processor 1014 provides deterministic real-time control of one or more actuated devices, and communicates on a real-time control bus (such as EtherCAT) to each dock interface 1008. The task processor 1016 provides task execution services, computation for sensing and perception, data management and analytics services, non real-time control of actuated devices, and network interfaces (USB, Ethernet) to external devices. The task processor 1016 and control processor 1014 may be separate cores on one CPU, a single core, or separate cores on separate computers, as desired.

The safety interface 1022 provides electrical and mechanical connection of an external safety device 1024 (such as an emergency-stop) to the backplane 1002.

The workcell 1000 may be provided in an enclosure, and a top plate of the enclosure functions as a calibrated work surface for an automation task. The work surface may include mounting points for attaching stationary items to enable the task, such as assembly jigs.

To kinematically register a docking module to the enclosure, any number of methods may be used. One method includes engaging three pins in the bottom plate of the backplane 1002 into three slots in the docking module housing. This uniquely and precisely constrains an orientation of the module with respect to the bottom plate when installed.

The workcell 1000 may include features to seal the enclosure when a peripheral is installed. For example, a gasket or rubber o-ring can be attached to the peripheral docking module bottom side. The enclosure top plate has a mating lip feature. When the module is installed, a clamping force of the module to the enclosure bottom plate causes the gasket to form a seal between the peripheral and the top plate.

The workcell 1000 may be attached to a flat surface such as a table, wall, or ceiling. The bottom plate may include through-hole features such that a bolt from above may attach the bottom plate to the surface. A removeable plug seal may be employed to access an attachment feature yet keep the enclosure sealed. Conversely, the bottom plate may include thread hole features such that a bolt from below may pull the bottom plate into the surface.

The workcell 1000 can include lighting (LED) and speakers to provide feedback to a user during operation and during configuration. These modalities can be used to notify a user of a malfunction or that the workcell 1000 is in operation. These modalities can also be used to enhance a user experience. For example, an audible 'click' can be generated whenever a peripheral is plugged in and successfully interrogated.

Figure 11:
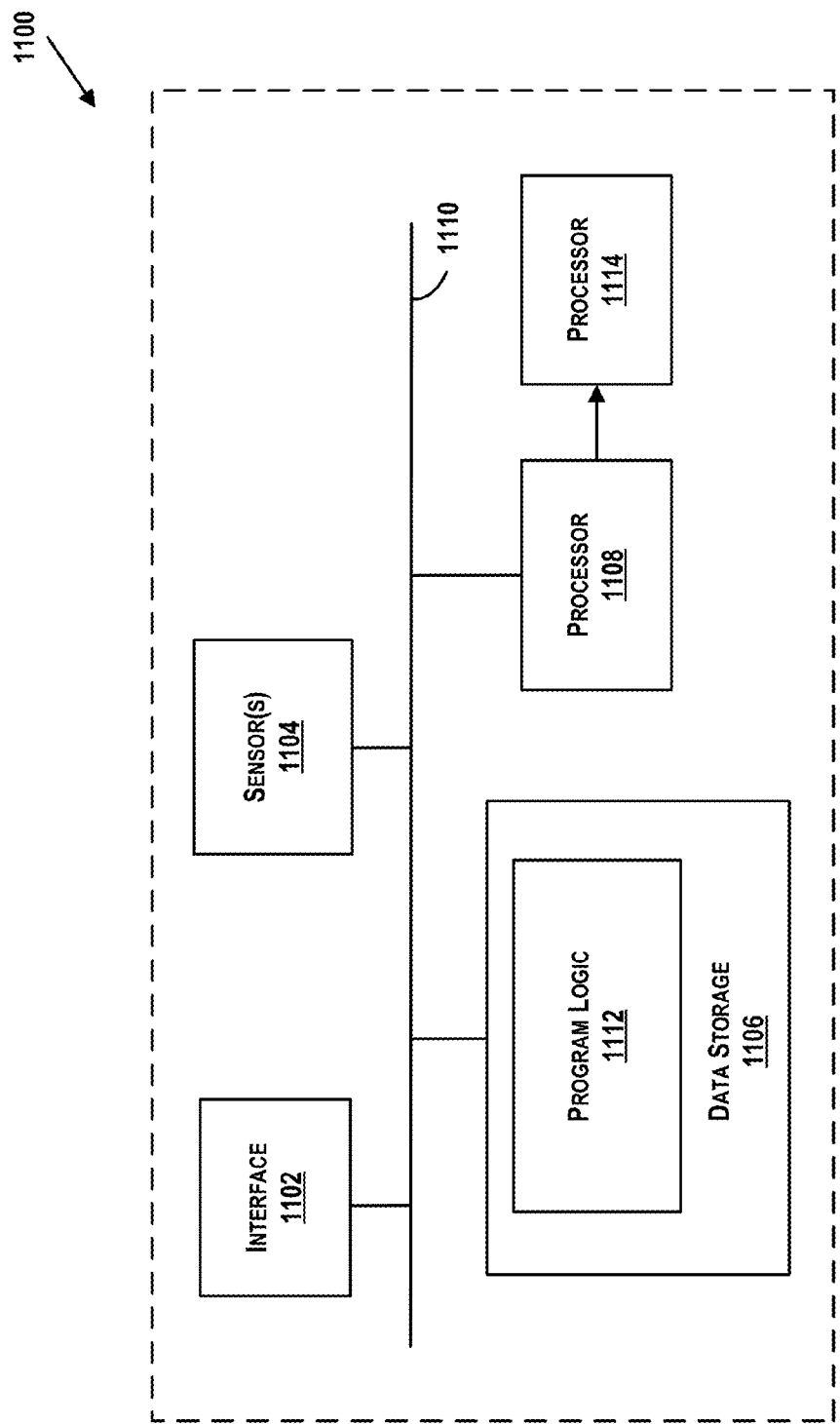
FIG. 11 illustrates a schematic drawing of an example computing device.

Many components of the workcell 1000 may take the form of a computing device, such as illustrated in FIG. 11, which illustrates a schematic drawing of an example computing device 1100. In some examples, some components illustrated in FIG. 11 may be distributed across multiple computing devices. However, for the sake of example, the components are shown and described as part of one example device 1100. The device 1100 may be or include a mobile device, desktop computer, tablet computer, or similar device that may be configured to perform the functions described herein.

The device 1100 may include an interface 1102, sensor(s) 1104, data storage 1106, and a processor 1108. Components illustrated in FIG. 11 may be linked together by a communication link 1110. The communication link 1110 is illustrated as a wired connection; however, wireless connections may also be used. The device 1100 may also include hardware to enable communication within the device 1100 and between the device 1100 and another computing device (not shown), such as a server entity. The hardware may include transmitters, receivers, and antennas, for example.

The interface 1102 may be configured to allow the device 1100 to communicate with another computing device (not shown), such as a server. Thus, the interface 1102 may be configured to receive input data from one or more computing devices, and may also be configured to send output data to the one or more computing devices. The interface 1102 may also be configured to receive input from and provide output to a torque controlled actuator, modular link of a robot arm, or other peripheral of a docking module, for example. The interface 1102 may include a receiver and transmitter to receive and send data. In other examples, the interface 1102 may also include a user-interface, such as a keyboard, microphone, touchscreen, etc., to receive inputs as well.

The sensor 1104 may include one or more sensors, or may represent one or more sensors included within the device 1100. Example sensors include an accelerometer, gyroscope, pedometer, light sensors, microphone, camera, or other location and/or context-aware sensors that may collect data of the peripheral (e.g., motion of arm) and provide the data to the data storage 1106 or processor 1108.

The processor 1108 may be configured to receive data from the interface 1102, sensor 1104, and data storage 1106. The data storage 1106 may store program logic 1112 that can be accessed and executed by the processor 1108 to perform functions executable to determine instructions for operation of the robotic system. Example functions include calibration of attached peripherals, operation of attached peripherals, safety detection functions, or other application-specific functions. Any functions described herein, or other example functions for the workcell may be performed by the device 1100 or processor 1108 of the device via execution of instructions stored on data storage 1106.

The device 1100 is illustrated to include an additional processor 1114. The processor 1114 may be configured to control other aspects of the device 1100 including displays or outputs of the device 1100 (e.g., the processor 1114 may be a GPU). Example methods described herein may be performed individually by components of the device 1100, or in combination by one or all of the components of the device 1100. In one instance, portions of the device 1100 may process data and provide an output internally in the device 1100 to the processor 1114, for example. In other instances, portions of the device 1100 may process data and provide outputs externally to other computing devices.

The computing device 1100 may be configured to determine calibrations of attached peripherals to the workcell, for example. A geometry of a work surface of the workcell is known as is a relative pose of all docking bays, mounting points, and docking modules. This knowledge enables calibration of peripherals when attached. Parts of the work surface may also be formed by the docking station covers. In one example, the processor 1108 may determine a first calibration of attached peripherals based on a location and the orientation of corresponding docking modules attached to the modular docking bays and based on an identification of the attached peripherals of the corresponding one or more docking modules. The processor 1108 may further determine a second calibration of the attached one or more peripherals based on operational data from the workcell, as discussed in more detail below.

An identification of the attached peripheral may be received in a number of ways. As one example, the peripheral may be attached to a workcell using an electrical connection (e.g., through a module as shown in FIGS. 8-9). In this example, data may be electrically provided that indicates information of the peripheral.

In another example, the peripheral may be attached to a module that couples to a docking bay mechanically. A set of pins or knobs may be actuated or pressed via inserted of the peripheral, and a certain combination of actuated pins or knobs may be associated with a peripheral identification. The processor 1108 may determine the set of actuated pins, and access a lookup table to determine what peripheral is associated with the actuated pins so as to mechanically identify the peripheral using no electrical communication to the peripheral or module, for example. Thus, a property of a mechanical interface may uniquely identify the peripheral and the workcell may lookup geometry information from a database that can be updated by a user. This may enable 3D-printing of custom peripherals and more dynamic extension of the workcell in the field.

In still further examples, a combination of mechanical and electrical connections and communications may be used to identify attached peripherals.

Figure 12:
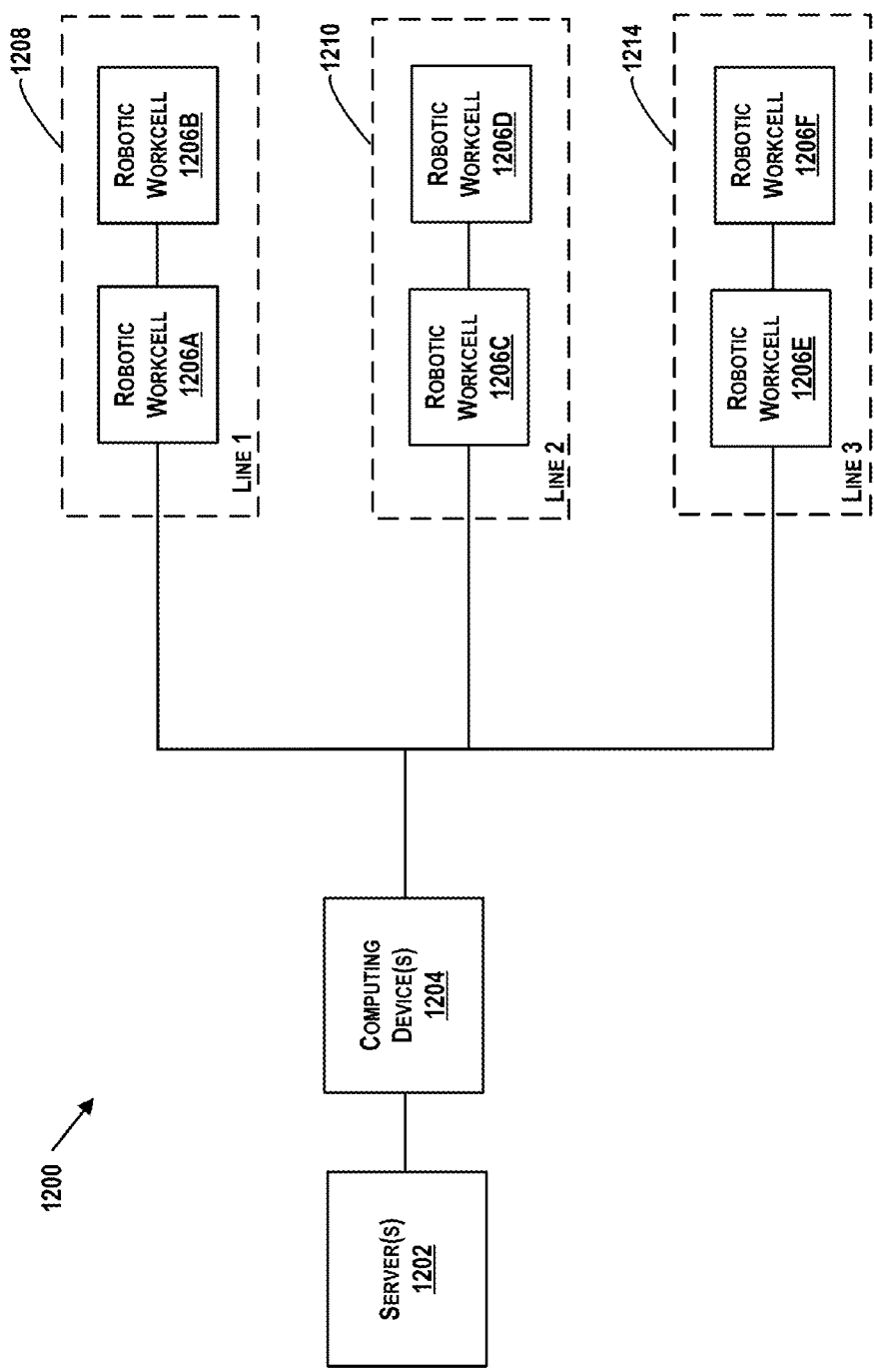
FIG. 12 illustrates an example system for management and analytics of robotics devices.

FIG. 12 illustrates an example system 1200 for management and analytics of robotics devices. The system 1200 includes one or more servers 1202 designed to manage a network of robotics devices and provide shared resources as well as data management and control services. The one or more servers are in wired or wireless communication with one or more computers 1204, and further in communication with one or more modular reconfigurable robotic workcells 1206A-1206F. The one or more servers 1202 may be located on-site, at the manufacturing facility with the robotics devices, or the one or more servers 1202 may be at an off-site location. Further, the one or more servers 1202 are configured to receive operational data from the robotic system. The operational data includes information indicative of one or more subtasks performed by the robotic system to complete a given task. For example, the operational data may include a count of a number of times a given subtask is performed, a load applied for a given subtask, a thermal profile for a given component of the robotic system, or a force applied for a given subtask. As another example, the operational data may include one or more error conditions for the one or more subtasks, such that an occurrence of one of the one or more error conditions causes the robotic system to stop performing the given task and provide for display an error message on an interface of a computing device.

In addition, the one or more servers 1202 are further configured to determine one or more operational performance metrics based on the received operational data. For example, the operational performance metrics may include a throughput time for a particular task to be completed, a quality assessment of a completed task, a ratio of downtime to operating time for a particular workcell, or a measure of a total manufacturing output capacity of the robotic system utilized at a given point in time.

The system 1200 may also include one or more computers 1204 in in wired or wireless communication with the one or more servers 1202 and the robotic workcells 1206A-1206F. The computing device(s) 1204 may take the form the computing device illustrated in FIG. 11, as an example. In one example embodiment, a first computing device may include a workstation authoring software application configured to program a given task to be completed by the robotic system 1200. The workstation authoring software application may include various building blocks for the robotic system 1200, such as tasks and subtasks. The workstation authoring software application may be configured to determine one or more subtasks required for the robotic system 1200 to perform the given task. The one or more subtasks may include one or more parameters used to define the one or more subtasks, and the one or more parameters include information required for the robotic system 1200 to execute the given subtask. The one or more parameters may include a location of a given peripheral, an orientation of a component of a given peripheral, a force limit for a component of a given peripheral, a rotation speed of a component of a given peripheral, or a pattern for a given peripheral to follow, as examples.

Task definitions created with the workstation authoring software application may be managed in a central repository and thus can be deployed on any robotic workcell in the system 1200 or moved from one robotic workcell to another. For example, one or more subtasks required for the system 1200 to perform a given task may be performed by two or more robotic workcells. In such a case, the workstation authoring software application may be configured to provide an option to move a given subtask from a first robotic workcell to a second robotic workcell. Further, the workstation authoring software application enables complex tasks that span multiple robotic workcells to be defined at a single computing device and deployed to a set of robotic workcells in the system 1200.

Continuing with the example embodiment, the system 1200 may include a second computing device with an operational dashboard software application configured to control one or more operations of the one or more robotic workcells 1206A-1206F. The operational dashboard software application may be further configured to provide for display a visual representation of the operational data and the one or more operational performance metrics on an interface of the second computing device. The one or more operations of the one or more robotic workcells 1206A-1206F may include one or more of selecting a given operation on a particular workcell, starting a given task on a particular workcell, pausing a given task on a particular workcell, or stopping a given task on a particular workcell, as examples. The operational dashboard software application provides a visualization of systems management information and status, such as firmware levels, software levels, and maintenance related metrics such as the number of cycles for various joints. As such, the operational dashboard software application enables a user to see integrated status information from multiple robotic workcells. In one example, the operational dashboard software application may be configured to determine a count of a number of times a given subtask is performed, and providing for display an alert on the interface of a computing device if the count exceeds a threshold.

In another embodiment, a single computing device may include both the workstation authoring software application and the operational dashboard software application. Other embodiments are possible as well.

FIG. 12 further illustrates three example assembly lines 1208, 1210 and 1214. Assembly line 1208 includes robotic workcells 1206A and 1206B, assembly line 1210 includes robotic workcells 1206C and 1206D, and assembly line 1214 includes robotic workcells 1206E and 1206F. Each assembly line may be configured to perform a given task. The robotic workcells 1206A-1206F each act as a client system in a network that are configured to connect to the one or more servers 1202 which act as a collection point for data generated during the normal operations of the robotic workcells. The robotic workcells 1206A-1206F may be configured to send operational data to the one or more servers 1202, such that the one or more servers 1202 can perform computationally intensive calculations that scale beyond the processing capacity of the individual workcells. All data collected by the robotic workcells 1206A-1206F (sensor data, images, videos, or point cloud data) may be stored by the one or more servers 1202 for later analysis, which enables a user to capture a digital footprint of all the work that is performed by the collaborative robotic workcells 1206A-1206F.

The robotic workcells 1206A-1206F may be configured as described above in FIGS. 1-11. As described above in relation to FIG. 11, the robotic workcell may include two processors. A first processor may be dedicated to performing all real time control software functions. A second processor may be dedicated to performing non-real time tasks such as interfacing with the network. This allows the workcell to act as a client for the one or more servers 1202 without neglecting critical control functions. The robotic workcells 1206A-1206F may include local storage capabilities and do not depend on permanent network connectivity in order to perform a given task once the task has been loaded on the workcell. An optional local control interface may be available to perform a limited set of systems management tasks when the workcell is disconnected from the network. The network may be configured to provide session-based connectivity between the robotic workcells 1206A-1206F and the one or more servers 1202 and one or more computing devices 1204 for status updates and control messages. The network may be further configured to provide a data replication service that can be used to transfer structured and unstructured data in an asynchronous mode. This allows the robotic workcells 1206A-1206F to temporarily operate in disconnected mode with reduced functionality.

All processing, access control, networking and data storage in the system 1200 may be designed for multitenancy, which allows multiple systems as described above to share the same physical compute infrastructure with a high degree of separation. Such a configuration is useful if the server-side components are provided in a cloud-based infrastructure and shared across multiple manufacturing facilities. It is also a desirable configuration if the same factory environment is used for multiple, separate manufacturing processes, as would be the case for a contract manufacturer, as an example.

One advantage of the proposed configuration described above in relation to FIG. 12 is the ability to automatically collect various forms of operational data related to robotic processes. The resulting stream of digital data may provide a real-time data feed on these robotic processes that can be used to evaluate operational efficiency and perform various optimizations. System 1200 is configured to collect operational data from multiple collaborative robotic workcells 1206A-1206F and maps it to operational performance metrics that can be linked to part and product data. The resulting operations dashboard gives real-time insight into the effectiveness of the workflows. Historical data can be used to perform trend analysis and discover any unexpected changes to the workflows. Further, such data can be used to discover potential bottlenecks in the workflow, and provide a solution to better optimize the system to increase throughput. Such as system allows for a data-driven evolution of robotic workflows with a quick feedback cycle.

Further, if a problem with a finished product is encountered, a precise forensic analysis can be performed based on the historical operational data captured by the system 1200. This provides a quantitative basis for identifying improvements to the workflow. In addition, as collaborative robotic workcells are used in inspection and test tasks, they facilitate the automated creation of digital quality records. Together with other operational metrics captured by the system 1200, such as cost or throughput, this data allows a manufacturer to better optimize the inherent tradeoffs involved in quality management.

Figure 13:
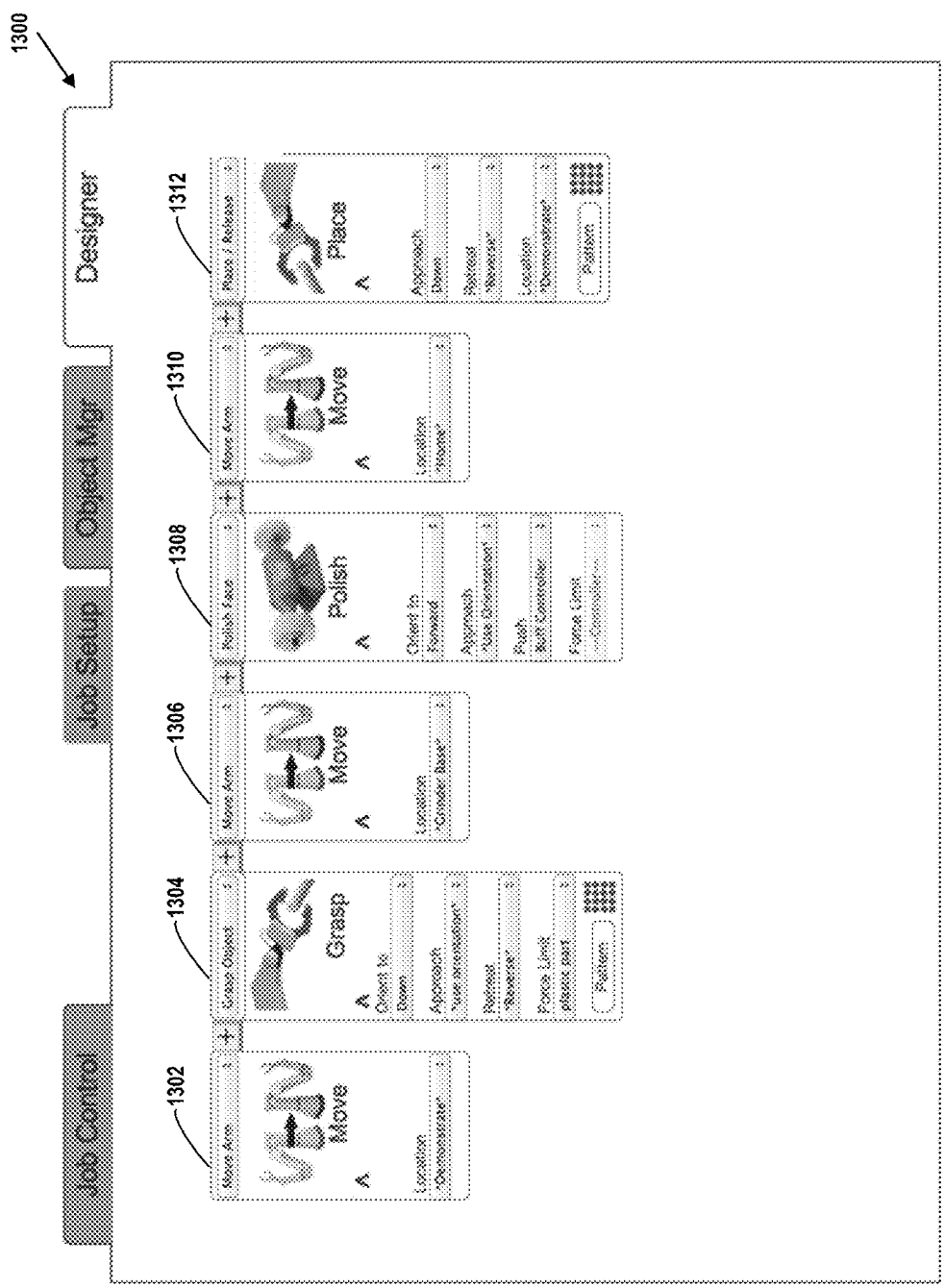
FIG. 13 illustrates an example workstation authoring interface, in accordance with an example embodiment.

FIG. 13 illustrates an example interface for the workstation authoring software application. In this example, the task to be performed by the robotic system is to polish an object and place the object in a desired location. The subtasks used to perform this task include move 1302, grasp 1304, move 1306, polish 1308, move 1310, and place 1312. Each of the subtasks have one or more parameters used to define that particular subtask. For example, the move subtasks 1302,

1306, 1310 may include a "Location" parameter used to define the location of where the robot arm should move to. The grasp 1304 subtask may include an "Orient to" parameter used to defined what direction the gripper is facing when grasping an object, an "Approach" parameter used to define how the gripper should approach an object, a "Retreat" parameter used to define how the gripper should move after grasping an object, a "Force Limit" parameter used to define how much force the gripper should use when grasping an object, and a "Location" parameter used to define an area in which the gripper grabs the objects. The polish 1408 subtask may also include an "Orient to" parameter, an "Approach", a "Push" parameter and a "Force Limit" parameter. The place 1312 subtask may also include an "Approach" parameter, a "Retreat" parameter, and a "Location" parameter. Other parameters are possible as well.

As shown in FIG. 13, each subtask may include a pull down menu for each parameter, such that a user may define a given parameter or select a manner in which the parameter may be defined. The parameters may be unresolved in various forms until runtime of the robotic system. At runtime, the parameters need to be bound to either a literal, variable, object property or object. Prior to runtime, the parameters may be bound to literals or symbols which are resolved at a later time. One example symbol may be "Demonstrate," where at runtime a user will move a robotic component to resolve this reference. Another example symbol may be "Home," which is a pre-defined position and orientation of a robotic component. Another example symbol may be a particular environment object name (e.g., "Grinder Base"), that has a specified position and orientation based on the orientation of the base of the given peripheral. Other example symbols are possible as well. One or more of the parameters may be automatically filled in based on a default setting. The default setting may be based at least in part by sensor data from one or more sensors of the robotic system.

Figure 14B:
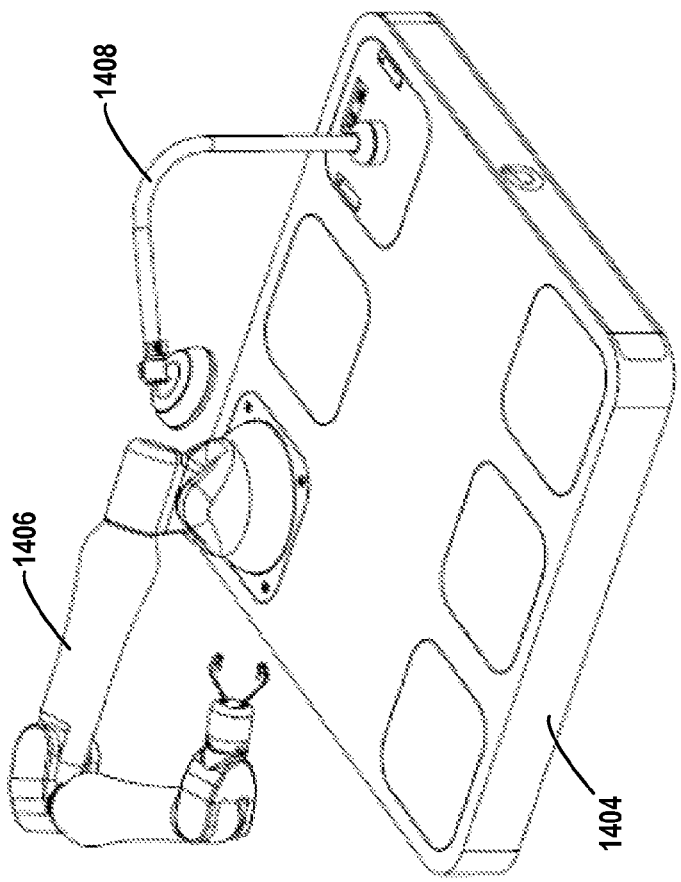
FIGS. 14A-14B illustrate another example workstation authoring interface, in accordance with an example embodiment.
Figure 14A:
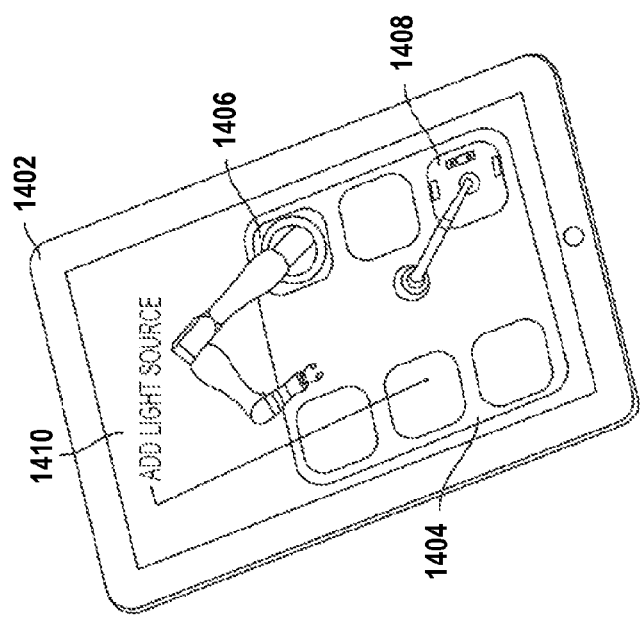

FIGS. 14A-14B illustrate another example interface for the workstation authoring software application. As discussed above, a computing device in communication with a workcell may be used to configure a workcell to execute a given task. Once the computing device receives the task, determines the peripherals needed to execute the task, and determines the task is feasible, the computing device may use peripheral description files for each peripheral to generate a priority queue of installation steps that need to be performed to correctly set up the complete workcell. This prioritization may occur according to a knowledge database of precedence rules. The computing device may subsequently guide the user through all of the installation steps while simultaneously checking that the installation is proceeding correctly.

FIG. 14A illustrates an example visual representation of the attached one or more peripherals on an interface of a computing device 1402. The computing device 1402 may be a mobile phone, a tablet, or a personal computer as examples. FIG. 14B illustrates an actual workcell 1404 with a robot arm peripheral 1406 and a camera peripheral 1408. The configuration of the actual workcell is illustrated on the computing device 1402, as shown in FIG. 14A. As the user installs various components to the workcell 1404 for the given task, a dynamically updated animation may be visualized in the client user-interface in real time. This allows the user to quickly visually verify that the descriptive model of the configuration is consistent with the actual workcell setup. If a peripheral is added or removed from the workcell 1404, the visualization on the computing device 1402 will reflect that change in real time.

Further, FIG. 14A illustrates an example where the workstation authoring software application determines that the current configuration of the workcell is insufficient to perform the desired task. In such a scenario, an error message 1410 may be displayed on the interface of the computing device 1402. In the example shown in FIG. 14A, the error message 1410 states that for the desired task to be performed, an additional light source is required. Using the workcell model visualization, the workstation authoring software application informs the user where the missing peripheral should be added for the workcell 1404 to be correctly configured to perform the desired task. Other example error messages are possible as well. For example, the computing device 1402 may determine that the camera resolution of an installed camera peripheral 1408 is not matched to the task. As another example, the computing device 1402 may determine that a given peripheral needs to be moved from the current docking station to a different docking station. This decision may be based on the workspace of a robot arm peripheral (e.g., to ensure that the robot arm peripheral has enough space to perform the desired task), the field of view of a camera peripheral and occlusions from other peripherals, or the relative positioning of a camera and light source. Other examples are possible as well.

Within some examples herein, operations may be described as methods for performing functions, and methods may be embodied on a computer program product (e.g., a tangible computer readable storage medium or non-transitory computer readable medium) that includes instructions executable to perform the functions.

Figure 15:
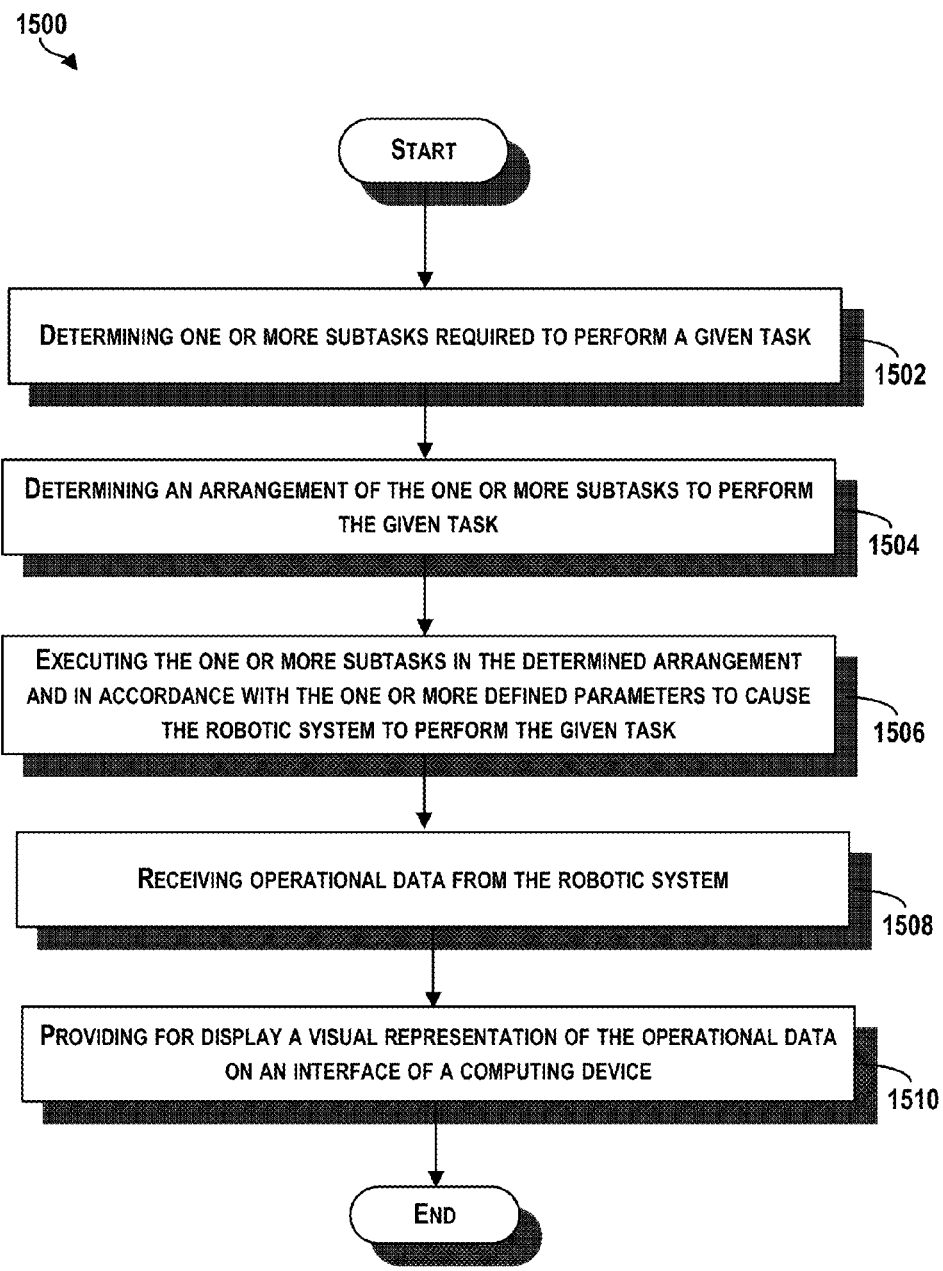
FIG. 15 is a flowchart illustrating an example method, in accordance with an example embodiment.

FIG. 15 is a flowchart illustrating an example method 1500 for configuring a workcell to perform a given task and collecting and displaying operational data of the robotic system as it performs the given task. Method 1500 may be performed by a computing device positioned inside an enclosure of a modular reconfigurable workcell. In another example, method 1500 may be performed by a computing device and one or more servers in wired or wireless communication with the robotic system. Further, the given computing device may provide a wired or wireless client interface that enables a user to provide input to the workcell and visualize the workcell from a tablet, mobile phone, or other such device.

Referring to FIG. 15, at block 1502, the method 1500 includes determining one or more subtasks required to perform a given task. In one example, the task may be chosen from a list of tasks capable of being performed by the workcell. The one or more subtasks may be performed by one or more peripherals of the robotic system. A computing device may store a list of peripherals available to the system, along with specific subtasks that each peripheral is capable of performing. The computing device may compare the subtasks needed to complete the given task, and determine which peripherals are needed to complete the subtasks. Further, the computing device may optimize the peripherals from the set of one or more peripherals. For example, if two subtasks of the given task each need camera peripherals, a single camera peripheral would be sufficient. As another example, if one subtask of the given task requires a low resolution camera peripheral, and another subtask requires a high resolution camera peripheral, the computing device may optimize the system to determine only one high resolution camera peripheral is necessary to perform all of the subtasks of the given task.

At block 1504 the method 1500 includes determining an arrangement of the one or more subtasks to perform the given task. The arrangement includes a combination of the one or more subtasks in a particular order, as shown in FIG. 13. In one example, the computing device may store templates for various tasks. In such a case, the computing device may receive the request for a given task, and recommend a template for that task. The template may include a list of one or more subtasks required to perform the task, along with the arrangement of those subtasks. Other examples are possible as well.

At block 1506, the method 1500 includes executing the one or more subtasks in the determined arrangement and in accordance with the one or more defined parameters to cause the robotic system to perform the given task. As the robotic system performs the given task, the method continues at block 1508 with receiving operational data from the robotic system, where the operational data includes information indicative of the executed one or more subtasks. As discussed above, the operational data may include a count of a number of times a given subtask is performed, a load applied for a given subtask, a thermal profile for a given component of the robotic system, or a force applied for a given subtask, as examples.

At block 1510, the method 1500 includes providing for display a visual representation of the operational data on an interface of the computing device. The visual representation may include a throughput time for a particular task to be completed, a quality assessment of a completed task, a ratio of downtime to operating time for a particular workcell, or a measure of a total manufacturing output capacity of the robotic system utilized at a given point in time, as examples. The visual representation may also include an error message if an error condition is present in the system. Other visual representations are possible as well.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A system, comprising:
   one or more servers in communication with a robotic system including one or more modular reconfigurable workcells, wherein the one or more modular reconfigurable workcells include one or more modular docking bays on a surface of the workcell that support attachment of one or more docking modules in a fixed geometric configuration, wherein each of the one or more modular docking bays include a plurality of electrical connections for a variety of power and communication busses of the one or more docking modules to be attached, and wherein the one or more docking modules provide an electrical and mechanical interface between a respective peripheral and the workcell, wherein the one or more servers are configured to receive operational data from the robotic system including information indicative of one or more subtasks performed by the robotic system to complete a given task, and wherein the one or more servers are further configured to determine one or more operational performance metrics based on the received operational data;
   a first computing device in communication with the robotic system including a workstation authoring software application, wherein the workstation authoring software application is configured to program the given task to be completed by the robotic system, and wherein the workstation authoring software application is further configured to determine one or more subtasks required for the robotic system to perform the given task, wherein the one or more subtasks include one or more parameters used to define the one or more subtasks, and wherein the one or more parameters include information required for the robotic system to execute a given subtask; and
   a second computing device in communication with the robotic system including an operational dashboard software application, wherein the operational dashboard software application is configured to control one or more operations of the one or more modular reconfigurable workcells of the robotic system, and wherein the operational dashboard software application is further configured to provide for display a visual representation of the operational data and the one or more operational performance metrics on an interface of the second computing device.

2. The system of claim 1, wherein the one or more operations of the one or more modular reconfigurable workcells of the robotic system includes one or more of selecting a given operation on a particular workcell, starting a given task on a particular workcell, pausing a given task on a particular workcell, and stopping a given task on a particular workcell.

3. The system of claim 1, wherein the operational performance metrics include one or more of a throughput time for a particular task to be completed, a quality assessment of a completed task, a ratio of downtime to operating time for a particular workcell, and a measure of a total manufacturing output capacity of the robotic system utilized at a given point in time.

4. The system of claim 1, wherein the one or more subtasks required for the robotic system to perform the given task are performed by two or more modular reconfigurable workcells, and wherein the workstation authoring software application is configured to provide an option to move a given subtask from a first modular reconfigurable workcell to a second modular reconfigurable workcell.

5. The system of claim 1, wherein the one or more subtasks are performed by a given peripheral of the robotic system.

6. The system of claim 5, wherein a given peripheral includes one or more of a robot arm, a camera, a gripper, a seven degree of freedom (DOF) arm with a camera, a device for assessing device-under-test functionality, a sensor for measuring a location of a device-under-test, and an input/output (I/O) peripheral for interfacing to an external device.

7. The system of claim 5, wherein the one or more parameters include one or more of a location of a given peripheral, an orientation of a component of a given peripheral, a force limit for a component of a given peripheral, a rotation speed of a component of a given peripheral, and a pattern for a given peripheral to follow.

8. The system of claim 1, wherein the operational data includes one or more of a count of a number of times a given subtask is performed, a load applied for a given subtask, a thermal profile for a given component of the robotic system, and a force applied for a given subtask.

9. The system of claim 1, wherein the operational dashboard software application is further configured to:
determine a count of a number of times a given subtask is performed by the robotic system; and
based on the count exceeding a threshold, provide for display an alert on the interface of the second computing device.

10. The system of claim 1, wherein the operational data includes one or more error conditions for the one or more subtasks, and wherein an occurrence of one of the one or more error conditions causes the robotic system to stop performing the given task and provide for display an error message on the interface of the second computing device.

11. The system of claim 1, wherein the one or more modular docking bays couple to the one or more docking modules through the electrical subsystem and via a printed circuit board (PCB) card edge connector or a wire harness.

12. The system of claim 1, wherein the one or more modular reconfigurable workcells is in communication with the one or more servers, such that the one or more servers receive operational data from the one or more modular reconfigurable workcells.

13. A system, comprising:
one or more modular reconfigurable workcells, wherein the one or more modular reconfigurable workcells include one or more modular docking bays on a surface of the workcell that support attachment of one or more docking modules in a fixed geometric configuration, wherein each of the one or more modular docking bays include a plurality of electrical connections for a variety of power and communication busses of the one or more docking modules to be attached, and wherein the one or more docking modules provide an electrical and mechanical interface between a respective peripheral and the workcell;
one or more servers in communication the one or more modular reconfigurable workcells, wherein the one or more servers are configured to receive operational data from the one or more reconfigurable workcells including information indicative of one or more subtasks performed by the one or more reconfigurable workcells to complete a given task, and wherein the one or more servers are further configured to determine one or more operational performance metrics based on the received operational data;
a computing device in communication with the one or more modular reconfigurable workcells, wherein the computing device includes a workstation authoring software application configured to program the given task to be completed by the one or more modular reconfigurable workcells, and wherein the computing device further includes an operational dashboard software application configured to control one or more operations of the one or more modular reconfigurable workcells, and wherein the operational dashboard software application is further configured to provide for display a visual representation of the operational data and the one or more operational performance metrics on an interface of the computing device.

14. The system of claim 13, wherein the one or more operations of the one or more modular reconfigurable workcells of the robotic system includes one or more of selecting a given operation on a particular workcell, starting a given task on a particular workcell, pausing a given task on a particular workcell, and stopping a given task on a particular workcell.

15. The system of claim 13, wherein the operational data includes one or more of a count of a number of times a given subtask is performed, a load applied for a given subtask, a thermal profile for a given component of the robotic system, and a force applied for a given subtask.

16. The system of claim 13, wherein the operational performance metrics include one or more of a throughput time for a particular task to be completed, a quality assessment of a completed task, a ratio of downtime to operating time for a particular workcell, and a measure of a total manufacturing output capacity the one or more modular reconfigurable workcells utilized at a given point in time.

* * * * *